US009531053B2

United States Patent
Fujiwara et al.

(10) Patent No.: US 9,531,053 B2
(45) Date of Patent: Dec. 27, 2016

(54) DIRECTIONAL COUPLER AND WIRELESS COMMUNICATION DEVICE

(71) Applicant: TDK Corporation, Tokyo (JP)

(72) Inventors: Toshiyasu Fujiwara, Tokyo (JP); Chengbin Lin, Tokyo (JP); Takeshi Oohashi, Tokyo (JP); Yukio Mitake, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 15/049,834

(22) Filed: Feb. 22, 2016

(65) Prior Publication Data

US 2016/0248141 A1     Aug. 25, 2016

(30) Foreign Application Priority Data

Feb. 24, 2015 (JP) ................. 2015-034066

(51) Int. Cl.
*H04B 1/44* (2006.01)
*H01P 5/18* (2006.01)

(52) U.S. Cl.
CPC .. *H01P 5/18* (2013.01); *H04B 1/44* (2013.01)

(58) Field of Classification Search
CPC ............... H04B 1/40; H04B 1/44; H04B 1/46; H04B 1/48; H01P 5/18; H01P 5/184; H01P 5/185; H01P 5/187; H01P 1/20345
USPC ........ 455/78, 82, 83, 84; 333/109, 112, 115, 333/116
See application file for complete search history.

(56) References Cited

U.S. PATENT DOCUMENTS

| 6,747,525 | B2  | 6/2004 | Iida et al. | |
| 8,525,614 | B2  | 9/2013 | Fujiwara et al. | |
| 8,754,723 | B2* | 6/2014 | Masuda ................. | H01P 5/187 333/116 |
| 9,000,864 | B2* | 4/2015 | Tanaka .................... | H01P 5/185 333/116 |
| 2013/0241667 | A1* | 9/2013 | Tamaru .................... | H01P 5/18 333/109 |

FOREIGN PATENT DOCUMENTS

| JP | 2002-280810 | 9/2002 |
| JP | 4604431 | 1/2011 |
| JP | 5472717 | 4/2014 |
| JP | 5472718 | 4/2014 |

* cited by examiner

*Primary Examiner* — Quochien B Vuong
(74) *Attorney, Agent, or Firm* — Oblon, McClelland, Maier & Neustadt, L.L.P.

(57) ABSTRACT

A directional coupler including a main line having an input terminal and an output terminal, and a sub-line having a coupling terminal and an isolation terminal, the main line, the sub-line, the input terminal, the output terminal, the coupling terminal and the isolation terminal being disposed within a laminate, wherein the main line and the sub-line extend in a loop shape in parallel with and spaced apart from each other by a gap such that electromagnetic coupling is generated therebetween and such that the main line is positioned outside the sub-line on a coupling layer, the input terminal, the output terminal, the coupling terminal and the isolation terminal are disposed outside the main line, and the main line is interposed between the output terminal and the sub-line.

15 Claims, 4 Drawing Sheets

DIRECTIONAL COUPLER AND WIRELESS COMMUNICATION DEVICE

BACKGROUND OF THE INVENTION

The present invention relates to a directional coupler and a wireless communication device, and particularly, to technologies for improving the isolation characteristic and directivity of the directional coupler to reduce an insertion loss by bringing innovations into layouts of conductor patterns and the like within a laminate which forms part of the directional coupler.

A directional coupler (hereinafter sometimes referred to as the "coupler") for extracting part of electric power propagated through a transmission line is an indispensable part for constructing a transmission circuit for a variety of wireless communication devices such as a mobile phone, a wireless LAN communication device, a communication device conforming to the Bluetooth (registered trademark) standard, and the like.

Specifically, a coupler forms part of adjusting means for controlling a transmission signal to keep its level constant, and this adjusting means comprises a power amplifier (hereinafter sometimes referred to as the "PA") capable of control a gain, a coupler for detecting the level of a transmission signal, and an automatic power control circuit (hereinafter sometimes referred to as the "APC circuit"). An input transmission signal is amplified by the PA, and then output through the coupler. The coupler supplies the APC circuit with a monitor signal which has a level corresponding to the level of the transmission signal output from the PA. The APC circuit controls the gain of the PA such that the output of the PA remains constant in accordance with the level of the monitor signal (i.e., the level of the transmission signal). The transmission output is stabilized by such feedback control of the PA.

The foregoing coupler comprises a main line and sub-line which are disposed in close proximity to each other to make electromagnetic coupling therebetween. The main line for transmitting a transmission signal comprises an input terminal at one end thereof, and an output terminal at the other end thereof, respectively. The sub-line for detecting the level of a transmission signal comprises a coupling terminal at one end thereof and an isolation terminal at the other end thereof, respectively. Then, part of a transmission signal transmitted through the main line is extracted by the sub-line, and is outputted to the APC circuit through the coupling terminal, as a monitor signal.

Such couplers are also provided in general as a one-chip component which comprises a main line, a sub-line, a variety of terminals, and the like arranged within a laminate which includes a plurality of conductor layers with an insulating layer interposed between the respective conductor layers.

Main characteristics of a coupler may include insertion loss, degree of coupling, isolation, and directivity. The insertion loss is a loss caused by the coupler, and is desired to be lower. The degree of coupling indicates the ratio of power propagating in a forward direction (direction from an input terminal to an output terminal of a main line) to power extracted to a coupling terminal. The isolation indicates a leakage of power propagating in a reverse direction (direction from the output terminal to the input terminal of the main line) to the coupling terminal, and is desired to be higher (a smaller leakage). The directivity, in turn, indicates the difference between isolation and degree of coupling, and a better coupler is defined to exhibit a higher directivity (larger absolute value), allowing for the formation of a satisfactory APC circuit with few detection errors.

Documents related to such a coupler include JP-A-2002-280810 (Patent Document 1), JP-B2-3651401 (Patent Document 2), JP-B2-5472717 (Patent Document 3), JP-B2-5472718 (Patent Document 4), and JP-B2-4604431 (Patent Document 5).

SUMMARY OF THE INVENTION

In the feedback control of the PA described above, the coupler is required to provide, as its main function, the abilities to separate and detect travelling wave power (transmission power) delivered from the PA from reflected wave components generated from circuits at later stages, such as an antenna. Accordingly, the isolation, which is a characteristic indicative of the level of such abilities (the degree to which the travelling wave can be separated from the reflected wave) is desirably as high as possible in view of performing precise control (this also applies to the directivity which is the difference between isolation and coupling).

To this end, the present inventors made a variety of investigations for improving the characteristics of the isolation and directivity. As a result, the inventors newly found that undesired electromagnetic coupling arising between a sub-line and a terminal causes deteriorations in the isolation characteristic and directivity, and that the coupling between an output terminal and the sub-line particularly exerts significant influences on the deteriorations in characteristics. Then, based on this insight, innovations were brought into respective conductor patterns within a laminate, particularly into the layout of a main line, a sub-line and terminals, thus leading to the completion of the present invention.

The inventions described in the aforementioned Patent Document 1 (JP-A-2002-280810) and Patent Document 2 (JP-B2-3651401), though they provide for improvements in isolation, are disadvantageous in an insertion loss caused by a longer line length due to their structures which have a main line and a sub-line respectively extending across two conductor layers. Further, since a shape pattern including right angles is drawn when spirally routing the main line and sub-line, undesired reflection occurs at these corners, possibly leading to deteriorations in isolation and directivity due to the reflection.

Patent Document 3 (JP-B2-5472717) and Patent Document 4 (JP-B2-5472718) in turn are both intended to reduce the size and thickness of couplers. The invention described in Patent Document 3 prevents undesired coupling between via holes (hereinafter simply referred to as the "vias") connected to a main line, a sub-line and terminals, while the invention described in Patent Document 4 improves the coupling while preventing deteriorations in isolation and directivity. However, any of the inventions described in these documents (as well as the remaining Patent Documents 1, 2, and 5) does not refer to the undesired coupling between a sub-line and a terminal, or provide any solution therefor.

Further, in the invention described in Patent Document 5 (JP-B2-4604431), extended electrodes are disposed to be orthogonal to a main line and a sub-line, respectively, in order to improve the isolation characteristic. However, in this invention, the main line and sub-line are both made in a spiral shape having a rectangular outer edge by connecting linear lines a plurality of time, thus making the resulting pattern susceptible to the undesired reflection at corners as mentioned above. Also, while the invention of Patent Document proposes thin-film technologies such as sputtering, vapor deposition, and the like for forming the main line and sub-line, an inter-layer coupling structure is employed for coupling the main line and sub-line in a laminating direction of the substrate, so that the resulting coupler is inferior in accuracy, due to difficulties in highly accurately controlling the thickness of an insulating layer, as compared with a coupler which employs an in-plane coupling structure which involves coupling a main line and a sub-line within the same layer.

It is therefore an object of the present invention to provide, in view of the newly found aspect of the coupling between a sub-line and a terminal, a coupler which prevents the electromagnetic coupling and exhibits satisfactory characteristics for each of isolation, directivity, and insertion loss.

To solve the aforementioned problem and achieve the object, a coupler (directional coupler) according to the present invention comprises a main line capable of transmitting a high-frequency signal; an input terminal disposed at one end of the main line for introducing the high-frequency signal into the main line; an output terminal disposed at the other end of the main line for delivering the high-frequency signal from the main line; a sub-line electromagnetically coupled to the main line for extracting a portion of the high-frequency signal; a coupling terminal disposed at one end of the sub-line; and an isolation terminal disposed at the other end of the sub-line, all disposed within a laminate having a plurality of conductor layers laminated with an insulating layer between respective ones of the conductor layers.

Then, the main line and sub-line extend in a loop shape in parallel with and spaced apart from each other by a certain gap such that electromagnetic coupling is generated therebetween and such that the main line is positioned outside the sub-line on a coupling layer which is one of the plurality of conductor layers. The input terminal, output terminal, coupling terminal, and isolation terminal are disposed outside the main line, when viewed from a laminating direction of the laminate. Then, the main line is interposed between the output terminal and the sub-line, when viewing the laminate from the laminating direction.

As previously described, coupling between respective terminals, among others, between the output terminal and the sub-line, exerts significant influences on, or otherwise causes deteriorations in the isolation characteristic and directivity of the coupler. To solve this problem, in the present invention, the main line is disposed so as to be interposed between the sub-line and the output terminal. In this way, undesired electromagnetic coupling between the sub-line and the output terminal is suppressed by the main line, thus making it possible to improve the characteristic of isolation and directivity. Also, in the present invention, since the main line is contained in a single conductor layer (coupling layer), instead of extending across a plurality of conductor layers as in the conventional structures (in Patent Documents 1, 2), the coupler can be reduced in thickness. Additionally, since the main line is short in length, the insertion loss can be kept low as well.

The respective terminals (input terminal, output terminal, coupling terminal, and isolation terminal) need not be necessarily disposed on the same conductor layer (coupling layer) as the main line and sub-line, but any one or two or more of the terminals may be disposed on another conductor layer. In this event, electric connections between the main line and sub-line and another terminal (or terminals) disposed on the other conductor layer may be made through an inter-layer connection conductor such as a via. Alternatively, the respective terminals may be terminals which appear on a plurality of conductor layers (extending vertically through a plurality of conductor layers) such as columnar conductors later described.

In the coupler of the present invention, the main line is preferably interposed between the isolation terminal and the sub-line when viewing the laminate from the laminating direction, and further, the main line is preferably interposed between the coupling terminal and the sub-line as well.

Among the coupling of the sub-line with the terminals, the coupling with the output terminal exerts the largest influence, but the coupling with other terminals, i.e., the isolation terminal and coupling terminal also exerts adverse influences on the isolation characteristic and directivity. For this reason, the main line is preferably interposed between the sub-line and the isolation terminal and coupling terminal as well to suppress the coupling, in a similar manner to the output terminal.

In one typical aspect of the present invention, the directional coupler further comprises an input terminal zone forming part of the input terminal, an output terminal zone forming part of the output terminal, a coupling terminal zone forming part of the coupling terminal, and an isolation terminal zone forming part of the isolation terminal, all arranged on the coupling layer. The input terminal zone, output terminal zone, coupling terminal zone, and isolation terminal zone are disposed outside of an area in which the main line is routed within the plane of the coupling layer. When viewing a line section of the sub-line closest from the output terminal zone within the plane of the coupling layer from the output terminal zone, the main line is interposed between the line section of the sub-line and the output terminal zone. This arrangement is intended to suppress the coupling between the output terminal zone and the sub-line by the main line.

In the above aspect, when viewing a line section of the sub-line closest from the isolation terminal zone within the plane of the coupling layer from the isolation terminal zone, the main line is preferably interposed between the line section of the sub-line and the isolation terminal zone. This arrangement is intended to suppress the coupling between the isolation terminal zone and the sub-line by the main line.

Further, for the same reason, when viewing a line section of the sub-line closest from the coupling terminal zone within the plane of the coupling layer from the coupling terminal zone, the main line is preferably interposed between the line section of the sub-line and the coupling terminal zone.

In another typical aspect of the present invention, the laminate has a rectangular plane shape. The input terminal includes a columnar input terminal at a first corner of the laminate when viewed from the laminating direction, where the columnar input terminal comprises a columnar conductor extending in the laminating direction of the laminate. The input terminal zone forms part of the columnar input terminal. The output terminal includes a columnar output terminal at a second corner of the laminate when viewed from the laminating direction, where the columnar output terminal comprises a columnar conductor extending in the laminating direction of the laminate. The output terminal zone forms part of the columnar output terminal. The isolation terminal includes a columnar isolation terminal at a third corner of the laminate when viewed from the laminating direction, where the columnar isolation terminal comprises a columnar conductor extending in the laminating direction of the laminate. The isolation terminal zone forms part of the columnar isolation terminal. The coupling terminal includes a columnar coupling terminal at a fourth corner of the laminate when viewed from the laminating direction, where the columnar coupling terminal comprises a columnar conductor extending in the laminating direction of the laminate. The coupling terminal zone forms part of the columnar coupling terminal.

In this different aspect, one end of the main line is connected to the input terminal zone. One end of the sub-line is connected to the coupling terminal zone. The other end of the main line and the other end of the sub-line are respectively disposed in a central area of the coupling layer. The coupler further comprises a main-line connection line having one end connected to the columnar output terminal, and a sub-line connection line having one end connected to the columnar isolation terminal, on a connection layer which is a different conductor layer from the coupling layer, wherein the other end of the main line and the other end of the main-line connection line are connected by a first inter-layer connection conductor, and the other end of the sub-line and the other end of the sub-line connection line are connected by a second inter-layer connection conductor.

In the coupler according to the present invention and respective aspects described above, the main line and sub-line are preferably configured to be free from bending corners. This is intended to prevent undesired reflection at the corner to cause deteriorations in the isolation characteristic and directivity.

Also, in the coupler according to the present invention and respective aspects described above, the gap between the main line and the sub-line is preferably set to be within a range of 20 to 80% of the line width of the main line. This range is defined to provide satisfactory characteristics with respect to the isolation and directivity. This aspect will be described later in detail in DESCRIPTION OF THE EMBODIMENTS.

A wireless communication device according to the present invention comprises a transmitter circuit capable of generating a transmission signal, and including a PA (power amplifier) for amplifying the transmission signal, and an APC circuit (automatic power control circuit) for controlling the power of the power amplifier; a receiver circuit capable of processing a received signal; an antenna for receiving/transmitting the transmission signal/received signal; a switch connected between the antenna and the transmitter circuit and the receiver circuit for delivering the received signal received through the antenna to the receiver circuit, and delivering the transmission signal output from the transmitter circuit to the antenna; and a coupler for detecting the level of the transmission signal delivered from the PA and supplying the detection signal to the APC circuit. The wireless communication device is configured to control the power of the PA based on the detection signal supplied from the coupler, where the coupler may be the coupler according to the present invention or any of the aspects described above.

According to the present invention, a coupler can be provided for preventing undesired coupling between the sub-line and the terminals, and exhibiting satisfactory characteristics for each of the isolation, directivity, and insertion loss.

BRIEF DESCRIPTION OF THE DRAWINGS

Other objects and features of the present invention will become apparent from the following detailed description considered in connection with the accompanying drawings.

In the drawings, wherein similar reference characters denote similar elements throughout the several views.

DESCRIPTION OF THE EMBODIMENTS

Figure 1:
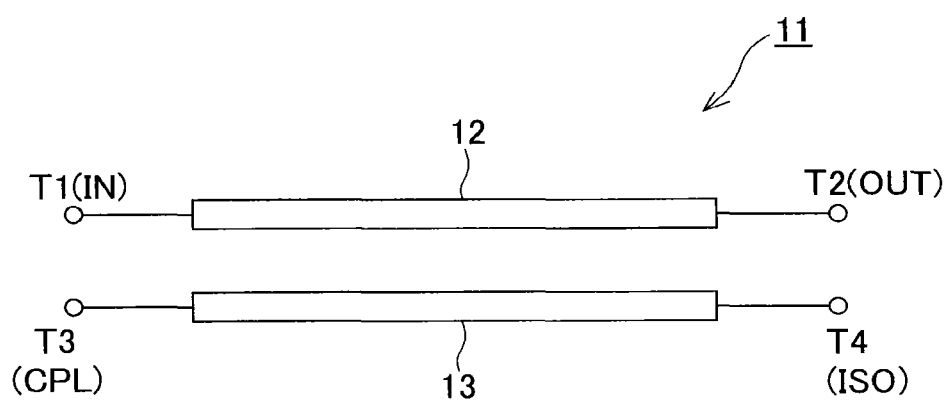
FIG. 1 is a circuit diagram conceptually illustrating a coupler according to one embodiment of the present invention.

As illustrated in FIG. 1, a coupler 11 according to one embodiment of the present invention comprises a main line 12 for transmitting a transmission signal, and a sub-line 13 disposed in close proximity to the main line 12 such that electromagnetic coupling is generated therebetween. The main line 12 has an input terminal T1 at one end thereof, and an output terminal T2 at the other end thereof. The sub-line 13 in turn has a coupling terminal T3 at one end thereof, and an isolation terminal T4 at the other end thereof. Also, since these main line 12 and sub-line 13 as well as the respective terminals T1-T4 make up the coupler of this embodiment in the form of one-chip electronic component, they are arranged within a laminate which comprises a plurality of conductor layers laminated with insulating layers interposed between the respective conductor layers.

Figure 2:
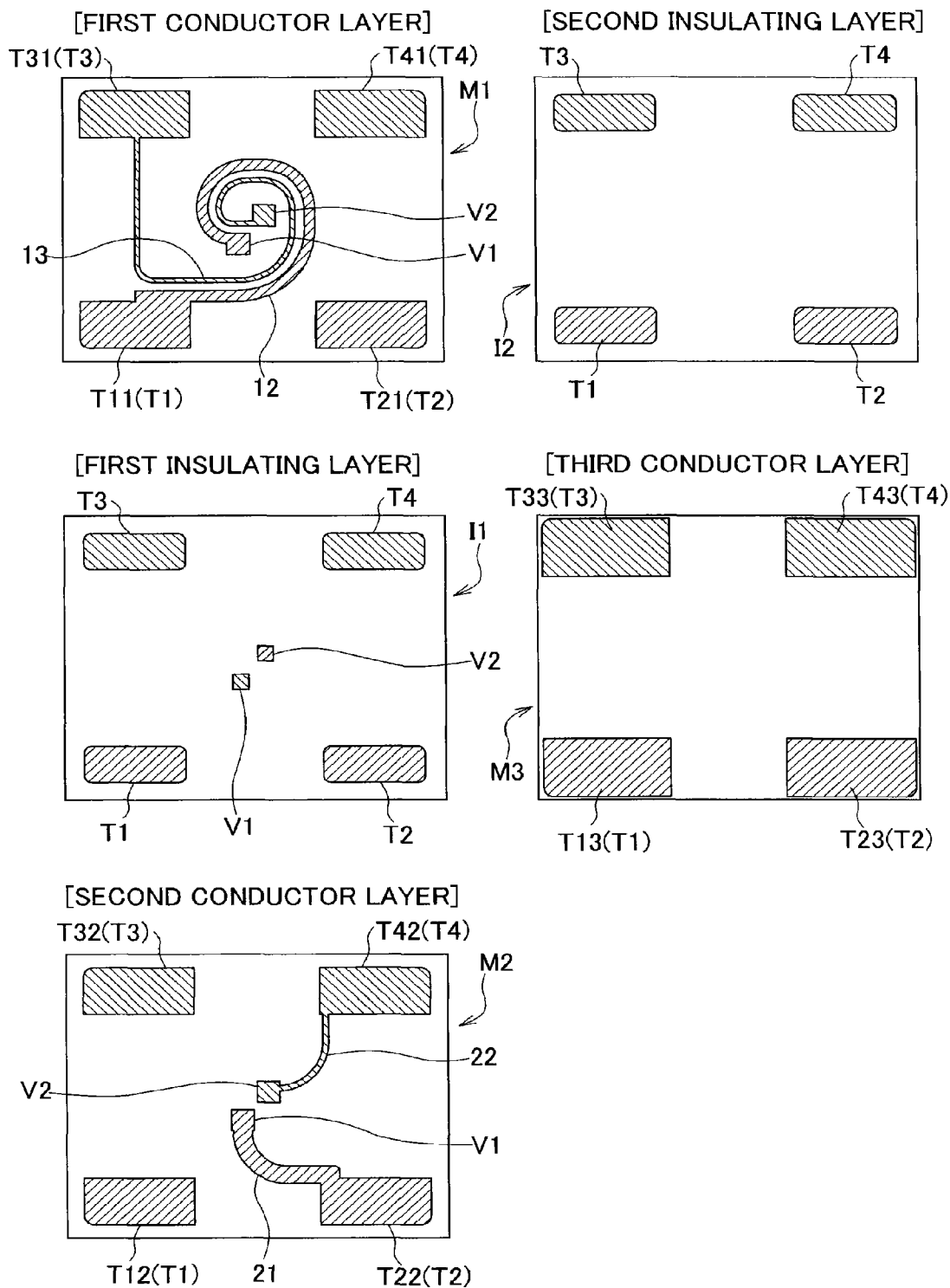
FIG. 2 is a horizontal sectional view illustrating the coupler according to the embodiment (a plan view illustrating respective conductor layers and respective insulator layers of a laminate which forms part of the coupler)

Specifically, the laminate has a rectangular geometry, as viewed in plane, as illustrated in FIG. 2, and includes a first conductor layer M1, a first insulating layer I1, a second conductor layer M2, a second insulating layer I2, and a third conductor layer M3, which are laminated in order. As appreciated, the coupler according to this embodiment may include other conductor layer and insulating layer, not shown, for example, a conductor layer comprising a ground electrode, and the like, in addition to the layers illustrated in FIG. 2.

The laminate comprises a columnar conductor at each of four corners thereof (four corners when viewed in plane) which extends vertically (in the direction in which the layers are laminated) through the laminate from the first conductor layer M1 through the third conductor layer M3. These conductors serve as columnar terminals T1-T4, and when designating the adjacent corners as a first through a fourth corner from the lower left corner of each layer in the counter-clockwise direction in FIG. 2, the columnar input terminal T1 is positioned at the first corner; the columnar output terminal T2 at the second corner; the columnar isolation terminal T4 at the third corner; and the columnar coupling terminal T3 at the fourth corner of the four corners.

Each of the columnar terminals T1-T4 appears as a terminal zone on the respective first, second, and third conductor layers M1, M2, M3. In particular, on each of the first through third conductor layers M1-M3, input terminal zones T11, T12, T13 appear at the first corner; output terminal zones T21, T22, T23 appear at the second corner; isolation terminal zones T41, T42, T43 appear at the third corner; and coupling terminal zones T31, T32, T33 appear at the fourth corner, respectively.

The main line 12 and sub-line 13 are routed on the first conductor layer M1 (coupling layer). The main line 12 is formed to extend from the first corner of the first conductor layer M1 to the center of the first conductor layer M1 in a loop shape (spirally or helically). The main line 12 has one end connected to the input terminal zone T11, and the other end to a via V1 (main line via/first inter-layer connection conductor) disposed in a central area of the first conductor layer.

The sub-line 13, on the other hand, is routed from the fourth corner to the first corner of the first conductor layer M1, and is formed to run inside (on the inner peripheral side of) the main line 12 and in parallel with the main line 12 such that the sub-line 12 extends in a loop shape from the first corner toward the center of the first conductor layer M1, in a similar manner to the main line 12, and such that the sub-line 13 is spaced away from the main line 12 by a certain gap in order to generate electromagnetic coupling therebetween (extends in parallel with the main line 12). The sub-line 13 has one end connected to the coupling terminal zone T31 at the fourth corner, and the other end connected to another via V2 (sub-line via/second inter-layer connection conductor) which is different from the main line via V1 positioned in the central area of the first conductor layer M1.

The main line 12 and sub-line 13 are both formed to linearly or curvilinearly extend without having bending corners. This is intended to prevent undesired reflection from occurring at bending corners, which would otherwise lead to deteriorated characteristics. Also, with the sub-line 13 placed inside the main line 12, the main line 12 is interposed between the sub-line 13 and each of the output terminal zone T21, isolation terminal zone T41, and coupling terminal zone T31 (each of the columnar output terminal T2, columnar isolation terminal T4, and columnar coupling terminal T3), thus making it possible to prevent undesired electromagnetic coupling between the terminal zones T21, T31, T41 (columnar terminals T2, T3, T4) and the sub-line 13 to compromise the isolation characteristic and directivity. Also, since the main line 12 is routed on the same conductor layer M1 with a small gap defined between the main line 12 and the sub-line 13 (the gap between both lines 12, 13 will be described later) to generate strong coupling therebetween, the main line 12 has a short length and therefore exhibits a small insertion loss.

The connection of the main line 12 to the columnar output terminal T2, and the connection of the sub-line 13 to the columnar isolation terminal T4 are made on the second conductor layer M2 (connection layer) which is laminated on the first insulating layer I1 interposed between the first and second conductor layers. In particular, the main-line via V1 and sub-line via V2 extend through the first insulating layer I1 to the second conductor layer M2, and on the second conductor layer M2, the other end of a main-line connection line 21, having one end connected to the columnar output terminal T2 (the output terminal zone T22 appearing at the second corner of the second conductor layer M2), is connected to the main-line via V1 in a central area of the second conductor layer M2. Also, on the second conductor layer M2, the other end of a sub-line connection line 22, having one end connected to the columnar isolation terminal T4 (the isolation terminal zone T42 appearing at the third corner of the second conductor layer M2), is connected to the sub-line via V2 in a central area of the second conductor layer M2.

It should be noted that the main-line connection line 21 and sub-line connection line 22 are formed to extend across the main line 12 and sub-line 13, not in parallel therewith, when viewed in plane (such that they run across the main line 12 and sub-line 13 when viewed in plane) in order to prevent unintended coupling of the main-line connection line 21 and sub-line connection line 22 with the main line 12 and sub-line 13 routed on the coupling layer M1. Additionally, these connection lines 21, 22 curvilinearly extend without having bending corners, in order to prevent undesired reflection, in a manner similar to the main line 12 and sub-line 13.

Figure 3:
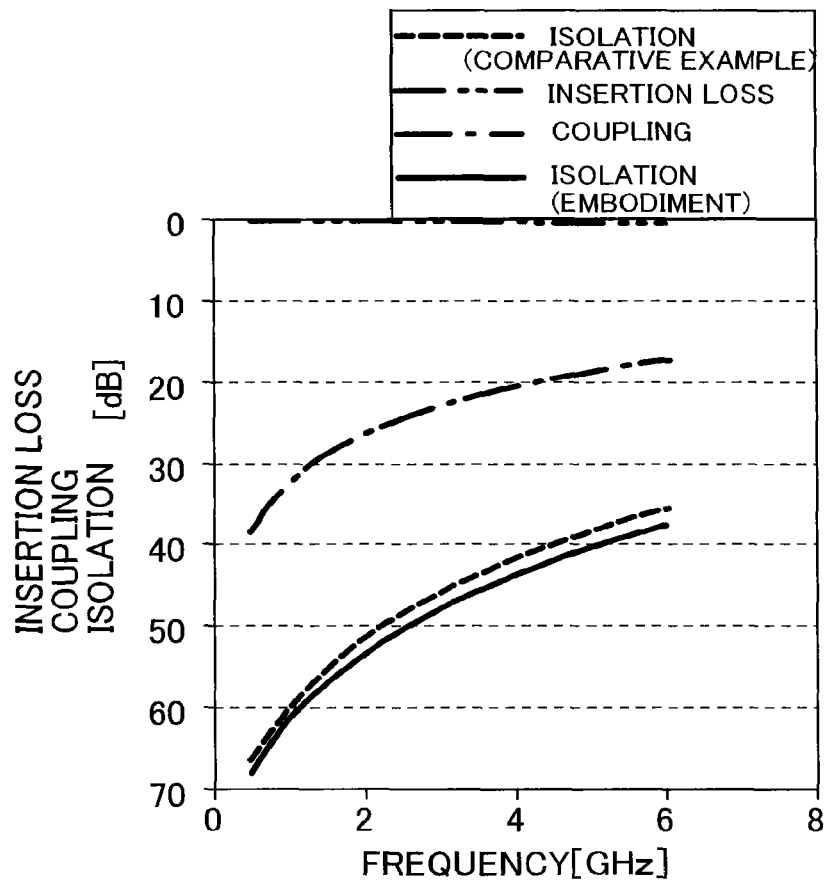
FIG. 3 is a graph representing the frequency characteristics for the insertion loss, coupling, and isolation of the coupler according to the embodiment, and the isolation of a coupler according to a comparative example.

FIG. 3 is a graph representing the result of a simulation relating to the frequency characteristics of the insertion loss, coupling, and isolation of the coupler according to the embodiment, and the isolation of a coupler of a comparative example. The coupler of the comparative example has a main line 12 and sub-line 13 wound in a loop shape, like the embodiment described above, but has opposite positioning of the main line 12 and sub-line 13, as opposed to the embodiment, i.e., the sub-line 13 is routed outside the main line 12.

In both of the embodiment and comparative example, the width of the main line 12 is set to 20 µm; the width of the sub-line 13 to 10 µm; the gap between the main line 12 and sub-line 13 to 10 µm; the electrode film thickness on the first conductor layer M1 (thickness of the main line 12 and sub-line 13) to 8 µm; the thickness of the first insulating layer I1 to 6 µm; the electrode film thickness of the second conductor layer M2 (thickness of the connection lines 21, 22) to 6 µm; and the electrode film thickness of the third conductor layer M3 and the thickness of the second insulating layer I2 to 6 µm.

As can be seen from FIG. 3, the coupler according to the embodiment exhibits an improved isolation characteristic over the comparative example.

Figure 4:
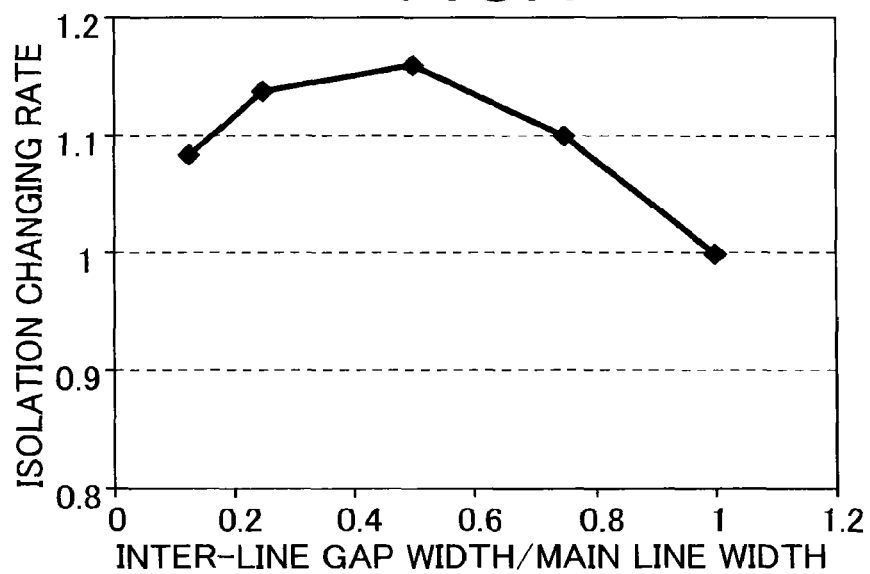
FIG. 4 is a graph representing a changing rate of the isolation characteristic when a gap between a main line and a sub-line is changed with respect to the width of the main line in the coupler according to the embodiment.

Further, FIG. 4 shows a changing rate of the isolation characteristic when the inter-line gap width between the main line 12 and the sub-line 13 (gap between both lines 12, 13) is changed with respect to the width of the main line 12 at a frequency of 5 GHz in the coupler according to the embodiment, from which it can be understood that the inter-line gap width exerts a significant influence on the isolation characteristic. Presumably, in the embodiment, the main line 12 is routed between the sub-line 12 and the terminal zones T21, T31, T41 (terminals T2, T3, T4) to thereby suppress undesired coupling between the sub-line 13 and the terminal zones T21, T31, T41 (terminals T2, T3, T4), resulting in improving the isolation characteristic. This isolation characteristic improvement effect becomes prominent as the gap between the sub-line 13 and main line 12 is reduced, and in particular, 10% or more of improvement effect is achieved when the inter-line gap width is equal to or less than 80% of the width of the main line 12. However, when the inter-line gap width is set to less than 20% of the width of the main line 12, a deterioration is observed in the isolation characteristic, on the contrary. Presumably, this is caused by excessively strong coupling between the main line 12 and sub-line 13.

Consequently, the inter-line gap width is preferably set to 20% or more of the width of the main line, and set to 50% in the embodiment. Also, the present invention defines the inter-line gap width in a range of 20-80% of the width of the main line, as described above, as a preferred implementation.

Figure 5:
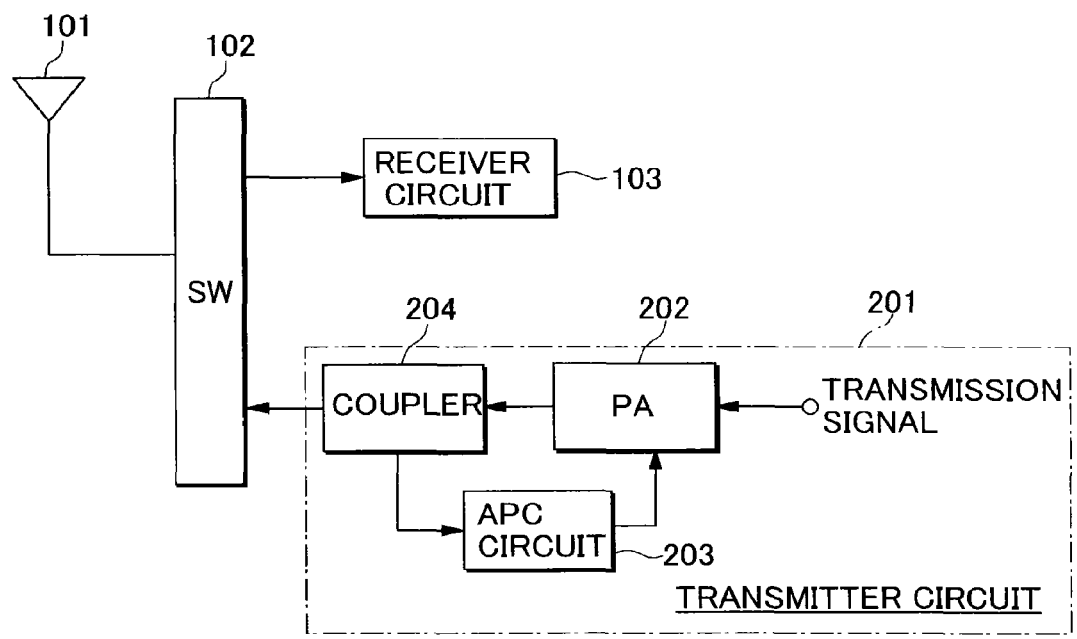
FIG. 5 is a block diagram illustrating an exemplary wireless communication device according to the present invention.

FIG. 5 is a block diagram illustrating an exemplary wireless communication device according to the present invention. As illustrated in FIG. 5, this wireless communication device comprises a transmitter circuit 201 for generating a transmission signal; a receiver circuit 103 for processing a received signal; an antenna 101 for receiving/transmitting a transmission signal/received signal; and a switch 102 connected between the antenna 101 and the transmitter circuit 201 and receiver circuit 103 for delivering a received signal received through the antenna 101 to the receiver circuit 103 and delivering a transmission signal output from the transmitter circuit 201 to the antenna 101.

The transmitter circuit 201 includes a PA (power amplifier) 202 for amplifying a transmission signal; an APC circuit (automatic power control circuit) 203 for controlling the power of the PA 202; and a coupler 204 for detecting the level of a transmission signal output from the PA 202, where the coupler 204 is implemented by the coupler according to the foregoing embodiment. The coupler 204 detects the level of a transmission signal output from the PA 202, and delivers the detection signal to the APC circuit 203. The APC circuit 203 controls the gain of the PA 202 based on the detection signal delivered from the coupler 204 such that the power of the PA 202 remains constant.

In this device, since the coupler 204 is implemented by the coupler according to the embodiment which exhibits a satisfactory isolation characteristic, the PA 202 can be more accurately controlled for the power.

While an embodiment of the present invention has been described above, it should be apparent to those skilled in the art that the present invention is not limited to the foregoing embodiment and a variety of modifications can be made within the scope of the claims.

For example, while the main line and sub-line have the shape of a loop which substantially draws an entire circle in the foregoing embodiment, the loop-shaped main line and sub-line may not draw an entire circle, but may be, for example, in a C-shape or U-shape, or may be in a spiral or helical shape with one or more turns.

In regard to the structure of the terminals, the foregoing embodiment comprises columnar terminals extending vertically through the laminate at the four corners of the same, but instead of such columnar terminals, the terminals may be structured to connect to external connection terminals disposed, for example, on the bottom of the laminate, through normal vias. Further, instead of the columnar terminals, terminals may be disposed on a side surface of the laminate such that the main line, sub-line, and connection lines may be drawn out to the outer edge of the laminate and connected to such side terminals. When any of these terminal structures is employed, the sub-line is routed inside the main line, and the main line and sub-line are formed in a loop shape, in a manner similar to the foregoing embodiment, such that the main line interposes between the terminals and the sub-line.

Also, the wireless communication device of the present invention is not limited to the example illustrated in FIG. 5, but may employ a variety of circuit configuration, other than the above, for example, a multi-band device which can utilize a plurality of frequency bands.

What is claimed is:

1. A directional coupler comprising:
a main line capable of transmitting a high-frequency signal;
an input terminal disposed at one end of said main line for introducing the high-frequency signal into said main line;
an output terminal disposed at the other end of said main line for delivering the high-frequency signal from said main line;
a sub-line electromagnetically coupled to said main line for extracting a portion of the high-frequency signal;
a coupling terminal disposed at one end of said sub-line; and
an isolation terminal disposed at the other end of said sub-line,
said main line, said input terminal, said output terminal, said sub-line, said coupling terminal, and said isolation terminal being disposed within a laminate having a plurality of conductor layers laminated with an insulating layer disposed between respective ones of said conductor layers, wherein:
said main line and said sub-line extend in a loop shape in parallel with and spaced apart from each other by a gap such that electromagnetic coupling is generated therebetween and such that said main line is positioned outside said sub-line on a coupling layer, said coupling layer being one of said plurality of conductor layers;
said input terminal, said output terminal, said coupling terminal, and said isolation terminal are disposed outside said main line, when viewed from a laminating direction of said laminate; and
said main line is interposed between said output terminal and said sub-line, when viewing said laminate from the laminating direction.

2. The directional coupler according to claim 1, wherein:
said main line is interposed between said isolation terminal and said sub-line when viewing said laminate from the laminating direction.

3. The directional coupler according to claim 1, wherein:
said main line is interposed between said coupling terminal and said sub-line when viewing said laminate from the laminating direction.

4. The directional coupler according to claim 2, wherein:
said main line is interposed between said coupling terminal and said sub-line when viewing said laminate from the laminating direction.

5. The directional coupler according to claims 1, further comprising:
an input terminal zone forming part of said input terminal, an output terminal zone forming part of said output terminal, a coupling terminal zone forming part of said coupling terminal, and an isolation terminal zone forming part of said isolation terminal on said coupling layer,
wherein said input terminal zone, said output terminal zone, said coupling terminal zone, and said isolation terminal zone are disposed outside of an area in which said main line is routed within the plane of said coupling layer; and
when viewing a line section of said sub-line closest from said output terminal zone within the plane of said coupling layer from said output terminal zone, said main line is interposed between said line section of said sub-line and said output terminal zone.

6. The directional coupler according to claim 5, wherein:
when viewing a line section of said sub-line closest from said isolation terminal zone within the plane of said coupling layer from said isolation terminal zone, said main line is interposed between said line section of said sub-line and said isolation terminal zone.

7. The directional coupler according to claim 5, wherein:
when viewing a line section of said sub-line closest from said coupling terminal zone within the plane of said coupling layer from said coupling terminal zone, said main line is interposed between said line section of said sub-line and said coupling terminal zone.

8. The directional coupler according to claim 6, wherein:
when viewing a line section of said sub-line closest from said coupling terminal zone within the plane of said coupling layer from said coupling terminal zone, said main line is interposed between said line section of said sub-line and said coupling terminal zone.

9. The directional coupler according to claim 5, wherein:
said laminate has a rectangular plane shape;
said input terminal includes a columnar input terminal at a first corner of said laminate when viewed from the laminating direction, said columnar input terminal comprising a columnar conductor extending in the laminating direction of said laminate;
said input terminal zone forms part of said columnar input terminal;
said output terminal includes a columnar output terminal at a second corner of said laminate when viewed from the laminating direction, said columnar output terminal comprising a columnar conductor extending in the laminating direction of said laminate;
said output terminal zone forms part of said columnar output terminal;
said isolation terminal includes a columnar isolation terminal at a third corner of said laminate when viewed from the laminating direction, said columnar isolation terminal comprising a columnar conductor extending in the laminating direction of said laminate;
said isolation terminal zone forms part of said columnar isolation terminal;
said coupling terminal includes a columnar coupling terminal at a fourth corner of said laminate when viewed from the laminating direction, said columnar coupling terminal comprising a columnar conductor extending in the laminating direction of said laminate;
said coupling terminal zone forms part of said columnar coupling terminal;
one end of said main line is connected to said input terminal zone; and
one end of said sub-line is connected to said coupling terminal zone;
the other end of said main line and the other end of said sub-line are respectively disposed in a central area of said coupling layer,
said coupler further comprising a main-line connection line having one end connected to said columnar output terminal, and a sub-line connection line having one end connected to said columnar isolation terminal, on a connection layer which is a conductor layer different from said coupling layer;
wherein the other end of said main line and the other end of said main-line connection line are connected by a first inter-layer connection conductor; and
the other end of said sub-line and the other end of said sub-line connection line are connected by a second inter-layer connection conductor.

10. The directional coupler according to claim 6, wherein:
said laminate has a rectangular plane shape;
said input terminal includes a columnar input terminal at a first corner of said laminate when viewed from the laminating direction, said columnar input terminal comprising a columnar conductor extending in the laminating direction of said laminate;
said input terminal zone forms part of said columnar input terminal;
said output terminal includes a columnar output terminal at a second corner of said laminate when viewed from the laminating direction, said columnar output terminal comprising a columnar conductor extending in the laminating direction of said laminate;
said output terminal zone forms part of said columnar output terminal;
said isolation terminal includes a columnar isolation terminal at a third corner of said laminate when viewed from the laminating direction, said columnar isolation terminal comprising a columnar conductor extending in the laminating direction of said laminate;
said isolation terminal zone forms part of said columnar isolation terminal;
said coupling terminal includes a columnar coupling terminal at a fourth corner of said laminate when viewed from the laminating direction, said columnar coupling terminal comprising a columnar conductor extending in the laminating direction of said laminate;
said coupling terminal zone forms part of said columnar coupling terminal;
one end of said main line is connected to said input terminal zone; and
one end of said sub-line is connected to said coupling terminal zone;
the other end of said main line and the other end of said sub-line are respectively disposed in a central area of said coupling layer,
said coupler further comprising a main-line connection line having one end connected to said columnar output terminal, and a sub-line connection line having one end connected to said columnar isolation terminal, on a connection layer which is a conductor layer different from said coupling layer;
wherein the other end of said main line and the other end of said main-line connection line are connected by a first inter-layer connection conductor; and
the other end of said sub-line and the other end of said sub-line connection line are connected by a second inter-layer connection conductor.

11. The directional coupler according to claim 7, wherein:
said laminate has a rectangular plane shape;
said input terminal includes a columnar input terminal at a first corner of said laminate when viewed from the laminating direction, said columnar input terminal comprising a columnar conductor extending in the laminating direction of said laminate;
said input terminal zone forms part of said columnar input terminal;
said output terminal includes a columnar output terminal at a second corner of said laminate when viewed from the laminating direction, said columnar output terminal comprising a columnar conductor extending in the laminating direction of said laminate;
said output terminal zone forms part of said columnar output terminal;
said isolation terminal includes a columnar isolation terminal at a third corner of said laminate when viewed from the laminating direction, said columnar isolation terminal comprising a columnar conductor extending in the laminating direction of said laminate;
said isolation terminal zone forms part of said columnar isolation terminal;
said coupling terminal includes a columnar coupling terminal at a fourth corner of said laminate when viewed from the laminating direction, said columnar coupling terminal comprising a columnar conductor extending in the laminating direction of said laminate;
said coupling terminal zone forms part of said columnar coupling terminal;

one end of said main line is connected to said input terminal zone; and one end of said sub-line is connected to said coupling terminal zone;

the other end of said main line and the other end of said sub-line are respectively disposed in a central area of said coupling layer, said coupler further comprising a main-line connection line having one end connected to said columnar output terminal, and a sub-line connection line having one end connected to said columnar isolation terminal, on a connection layer which is a conductor layer different from said coupling layer;

wherein the other end of said main line and the other end of said main-line connection line are connected by a first inter-layer connection conductor; and the other end of said sub-line and the other end of said sub-line connection line are connected by a second inter-layer connection conductor.

12. The directional coupler according to claim 8, wherein:
said laminate has a rectangular plane shape;
said input terminal includes a columnar input terminal at a first corner of said laminate when viewed from the laminating direction, said columnar input terminal comprising a columnar conductor extending in the laminating direction of said laminate;
said input terminal zone forms part of said columnar input terminal;
said output terminal includes a columnar output terminal at a second corner of said laminate when viewed from the laminating direction, said columnar output terminal comprising a columnar conductor extending in the laminating direction of said laminate;
said output terminal zone forms part of said columnar output terminal;
said isolation terminal includes a columnar isolation terminal at a third corner of said laminate when viewed from the laminating direction, said columnar isolation terminal comprising a columnar conductor extending in the laminating direction of said laminate;
said isolation terminal zone forms part of said columnar isolation terminal;
said coupling terminal includes a columnar coupling terminal at a fourth corner of said laminate when viewed from the laminating direction, said columnar coupling terminal comprising a columnar conductor extending in the laminating direction of said laminate;
said coupling terminal zone forms part of said columnar coupling terminal;

one end of said main line is connected to said input terminal zone; and one end of said sub-line is connected to said coupling terminal zone;

the other end of said main line and the other end of said sub-line are respectively disposed in a central area of said coupling layer, said coupler further comprising a main-line connection line having one end connected to said columnar output terminal, and a sub-line connection line having one end connected to said columnar isolation terminal, on a connection layer which is a conductor layer different from said coupling layer;

wherein the other end of said main line and the other end of said main-line connection line are connected by a first inter-layer connection conductor; and the other end of said sub-line and the other end of said sub-line connection line are connected by a second inter-layer connection conductor.

13. The directional coupler according to claim 1, wherein:
said main line and said sub-line are free from bending corners.

14. The directional coupler according to claim 1, wherein:
said gap between said main line and said sub-line is set to be within a range of 20 to 80% of the line width of said main line.

15. A wireless communication device comprising:
a transmitter circuit capable of generating a transmission signal, and including a power amplifier for amplifying the transmission signal, and an automatic power control circuit for controlling the power of said power amplifier;
a receiver circuit capable of processing a received signal;
an antenna for receiving/transmitting the transmission signal/received signal;
a switch connected between said antenna and said transmitter circuit and said receiver circuit for delivering the received signal received through said antenna to said receiver circuit, and delivering the transmission signal output from said transmitter circuit to said antenna; and
a directional coupler for detecting the level of the transmission signal delivered from said power amplifier and supplying the detection signal to said automatic power control circuit,
said wireless communication device being configured to control the power of said power amplifier based on the detection signal supplied from said directional coupler,
wherein said directional coupler comprises said directional coupler according to claim 1.

* * * * *